(12) United States Patent
Laaksonen

(10) Patent No.: US 11,395,087 B2
(45) Date of Patent: Jul. 19, 2022

(54) LEVEL-BASED AUDIO-OBJECT INTERACTIONS

(71) Applicant: Nokia Technologies Oy, Espoo (FI)

(72) Inventor: Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/720,417

(22) Filed: Sep. 29, 2017

(65) Prior Publication Data

US 2019/0104375 A1 Apr. 4, 2019

(51) Int. Cl.
*H04S 7/00* (2006.01)

(52) U.S. Cl.
CPC .............. *H04S 7/303* (2013.01); *H04S 7/301* (2013.01); *H04R 2420/07* (2013.01); *H04S 2400/01* (2013.01); *H04S 2400/03* (2013.01); *H04S 2400/11* (2013.01); *H04S 2400/15* (2013.01); *H04S 2420/01* (2013.01); *H04S 2420/03* (2013.01); *H04S 2420/07* (2013.01)

(58) Field of Classification Search
CPC ...... H04S 7/303; H04S 7/301; H04S 2400/11; H04S 2400/15
See application file for complete search history.

(56) References Cited

U.S. PATENT DOCUMENTS

| | | | |
|---|---|---|---|
| 5,450,494 A * | 9/1995 | Okubo | ..................... H03G 3/32 348/E5.122 |
| 5,633,993 A | 5/1997 | Redmann | |
| 5,754,939 A | 5/1998 | Herz | |
| 6,151,020 A | 11/2000 | Palmer | |
| 6,330,486 B1 | 12/2001 | Padula | ........................... 700/94 |
| 7,099,482 B1 | 8/2006 | Jot et al. | ......................... 381/61 |
| 7,266,207 B2 | 9/2007 | Wilcock et al. | |
| 7,492,915 B2 | 2/2009 | Jahnke | |

(Continued)

FOREIGN PATENT DOCUMENTS

| | | |
|---|---|---|
| CN | 1857027 A | 11/2006 |
| CN | 101999067 A | 3/2011 |

(Continued)

OTHER PUBLICATIONS

Alessandro Pieropan, Giampiero Salvi, Karl Pauwels, Hedvig Kjellstrom *Audio-Visual Classification and Detection of Human Manipulation Actions* [https://www.csc.kth.se/~hedvig/publications/iros_14.pdf] retrieved Sep. 29, 2017.

(Continued)

*Primary Examiner* — Ping Lee
(74) *Attorney, Agent, or Firm* — Harrington & Smith

(57) ABSTRACT

A method includes obtaining a listening position associated with a user and obtaining audio and metadata corresponding to a rendering at the listening position. The method also includes obtaining a listening environment and determining an effect of the listening environment on the rendering at the listening position. The method further includes detecting audio interaction at the listening position by comparing an audio rendering level against a corresponding level threshold, and applying, by a processing device, an audio modification according to the audio interaction detection. Audio is rendered at the listening position based on the applied audio modification.

21 Claims, 7 Drawing Sheets

(56) References Cited

U.S. PATENT DOCUMENTS

| | | |
|---|---|---|
| 7,840,668 B1 | 11/2010 | Sylvain |
| 8,187,093 B2 | 5/2012 | Hideya et al. |
| 8,189,813 B2 | 5/2012 | Muraoka et al. |
| 8,411,880 B2 | 4/2013 | Wang et al. |
| 8,509,454 B2 | 8/2013 | Kirkeby et al. |
| 8,831,255 B2 | 9/2014 | Crawford et al. |
| 8,990,078 B2 | 3/2015 | Nakadai et al. |
| 9,161,147 B2 | 10/2015 | Korn |
| 9,179,232 B2 | 11/2015 | Jarske et al. |
| 9,197,979 B2 | 11/2015 | Lemieux et al. |
| 9,215,539 B2 | 12/2015 | Kim et al. |
| 9,271,081 B2 | 2/2016 | Corteel et al. |
| 2002/0150254 A1 | 10/2002 | Wilcock et al. |
| 2002/0150257 A1 | 10/2002 | Wilcock et al. ............ 381/17 |
| 2006/0025216 A1* | 2/2006 | Smith .................. A63F 13/87 463/35 |
| 2008/0123864 A1 | 5/2008 | Reichelt et al. |
| 2008/0144864 A1 | 6/2008 | Huon |
| 2008/0247567 A1 | 10/2008 | Kjolerbakken et al. |
| 2009/0016540 A1* | 1/2009 | Heningsen Nielsen . H03G 1/02 381/56 |
| 2009/0138805 A1 | 5/2009 | Hildreth |
| 2009/0240359 A1 | 9/2009 | Hyndman |
| 2009/0253512 A1 | 10/2009 | Nickell |
| 2009/0262946 A1 | 10/2009 | Dunko |
| 2009/0286600 A1* | 11/2009 | Hideya .................. A63F 13/54 463/35 |
| 2010/0098274 A1 | 4/2010 | Hannemann et al. |
| 2010/0119072 A1 | 5/2010 | Ojanpera |
| 2010/0169796 A1 | 7/2010 | Lynk |
| 2010/0208905 A1 | 8/2010 | Franck et al. |
| 2011/0002469 A1 | 1/2011 | Ojala |
| 2011/0129095 A1 | 6/2011 | Avendano et al. |
| 2011/0166681 A1 | 7/2011 | Lee et al. |
| 2012/0027217 A1 | 2/2012 | Jun et al. |
| 2012/0093320 A1 | 4/2012 | Flaks et al. ............... 381/17 |
| 2012/0230512 A1 | 9/2012 | Ojanpera |
| 2012/0232910 A1 | 9/2012 | Dressler et al. ............. 704/500 |
| 2012/0295637 A1 | 11/2012 | Hannuksela |
| 2013/0114819 A1 | 5/2013 | Melchior et al. |
| 2013/0259243 A1 | 10/2013 | Herre et al. |
| 2013/0321396 A1 | 12/2013 | Kirk |
| 2013/0321586 A1 | 12/2013 | Kirk et al. |
| 2014/0010391 A1 | 1/2014 | Ek et al. |
| 2014/0133661 A1 | 5/2014 | Harma et al. ............... 381/22 |
| 2014/0153753 A1 | 6/2014 | Crockett ................. 381/307 |
| 2014/0285312 A1 | 9/2014 | Laaksonen |
| 2014/0328505 A1* | 11/2014 | Heinemann ............ H04S 7/303 381/303 |
| 2014/0350944 A1 | 11/2014 | Jot et al. |
| 2014/0361976 A1 | 12/2014 | Osman |
| 2015/0002388 A1 | 1/2015 | Weston et al. |
| 2015/0003616 A1 | 1/2015 | Middlemiss et al. |
| 2015/0055937 A1 | 2/2015 | Van Hoff et al. ............ 386/285 |
| 2015/0063610 A1 | 3/2015 | Mossner |
| 2015/0078594 A1 | 3/2015 | McGrath et al. |
| 2015/0116316 A1 | 4/2015 | Fitzgerald et al. .......... 345/419 |
| 2015/0146873 A1 | 5/2015 | Chabanne et al. ................ 7/305 |
| 2015/0223002 A1 | 8/2015 | Mehta et al. ................... 7/30 |
| 2015/0245153 A1 | 8/2015 | Malak ..................... 381/57 |
| 2015/0263692 A1 | 9/2015 | Bush |
| 2015/0302651 A1 | 10/2015 | Shpigelman |
| 2015/0316640 A1 | 11/2015 | Jarske et al. |
| 2015/0362733 A1 | 12/2015 | Spivack |
| 2016/0050508 A1 | 2/2016 | Redmann |
| 2016/0084937 A1 | 3/2016 | Lin |
| 2016/0112819 A1 | 4/2016 | Mehnert et al. |
| 2016/0125867 A1 | 5/2016 | Jarvinen et al. |
| 2016/0142830 A1 | 5/2016 | Hu |
| 2016/0150267 A1 | 5/2016 | Strong |
| 2016/0150343 A1 | 5/2016 | Wang et al. |
| 2016/0150345 A1 | 5/2016 | Jang |
| 2016/0182944 A1* | 6/2016 | Han ...................... H04N 5/60 348/738 |
| 2016/0192105 A1 | 6/2016 | Breebaart et al. |
| 2016/0212272 A1 | 7/2016 | Srinivasan et al. |
| 2016/0227337 A1 | 8/2016 | Goodwin et al. |
| 2016/0227338 A1 | 8/2016 | Oh et al. |
| 2016/0266865 A1 | 9/2016 | Tsingos |
| 2016/0300577 A1 | 10/2016 | Fersch et al. |
| 2016/0313790 A1 | 10/2016 | Clement et al. |
| 2017/0077887 A1 | 3/2017 | You |
| 2017/0110155 A1 | 4/2017 | Campbell et al. |
| 2017/0150252 A1 | 5/2017 | Trestain et al. |
| 2017/0165575 A1 | 6/2017 | Ridihalgh et al. |
| 2017/0169613 A1 | 6/2017 | VanBlon et al. |
| 2017/0208415 A1 | 7/2017 | Ojala |
| 2017/0223478 A1 | 8/2017 | Jot et al. |
| 2017/0230760 A1 | 8/2017 | Sanger et al. |
| 2017/0289486 A1* | 10/2017 | Stroffolino ......... H04N 5/44513 |
| 2017/0295446 A1 | 10/2017 | Thagadur Shivappa |
| 2017/0366914 A1 | 12/2017 | Stein et al. |
| 2019/0329129 A1 | 10/2019 | Fajt et al. |

FOREIGN PATENT DOCUMENTS

| | | |
|---|---|---|
| CN | 102668374 A | 9/2012 |
| CN | 102855133 A | 1/2013 |
| CN | 103702072 A | 4/2014 |
| CN | 104010265 A | 8/2014 |
| CN | 104041081 A | 9/2014 |
| CN | 104737557 A | 6/2015 |
| CN | 105611481 A | 5/2016 |
| EP | 2 030 660 A1 | 3/2009 |
| EP | 2688318 A1 | 1/2014 |
| GB | 2540175 A | 1/2017 |
| WO | WO-2009092060 A2 | 7/2009 |
| WO | WO-2009128859 A1 | 10/2009 |
| WO | WO-2010/020788 A1 | 2/2010 |
| WO | WO-2011/020067 A1 | 2/2011 |
| WO | WO-2011020065 A1 | 2/2011 |
| WO | WO-2013/064943 A1 | 5/2013 |
| WO | WO-2013/155217 A1 | 10/2013 |
| WO | WO-2014/130221 A1 | 8/2014 |
| WO | WO-2014168901 A1 | 10/2014 |
| WO | WO-2015/152661 A1 | 10/2015 |
| WO | WO-2016014254 A1 | 1/2016 |
| WO | WO-2017120681 A1 | 7/2017 |

OTHER PUBLICATIONS

Micah T. Taylor, Anish Chandak, Lakulish Antani, Dinesh Manocha, *RESound: Interactive Sound Rendering for Dynamic Virtual Enviroments* MM'09, Oct. 19-24, 2009, Beijing, China. http://gamma.cs.unc.edu/Sound/RESound/.

Hatala, Marek et al., "Ontology-Based User Modeling in an Augmented Audio Reality System for Museums", http://citeseerx.ist.psu.edu/viewdoc/download?doi=10.1.1.91.5712&rep=repl&type=pdf; Aug. 29, 2016, 38 pgs.

Gunel, Banu et al., "Spatial Synchronization of Audiovisual Objects by 3D Audio Object Coding", IEEE 2010, pp. 460-465; https://www.researchgate.net/profile/E_Ekmekcioglu/publication/251975482_Spatial_synchronization_of_audiovisual_objects_by_3D_audio_object_coding/links/54e783660cf2f7aa4d4d858a.pdf>; 2010.

Cameron Faulkner, "*Google's Adding Immersive Audio to your Virtual Reality Worlds*" http://www.in.techradar.com/news/misc/googlesaddingimmersiveaudiotoyourvrworlds/articleshow/57191578.cms retrieved Feb. 16, 2017.

Simon Galvez, Marcos F.; Menzies, Dylan; Fazi, Filippo Maria; de Campos, Teofilo; Hilton, Adrian "A Listener Position Adaptive Stereo System for Object-Based Reproduction" http://www.aes.org/e-lib/browse.cfin?elib=17670 dated May 6, 2015.

Anil Camci, Paul Murray, Angus Graeme Forbes, "*A Web-based UI for Designing 3D Sound Objects and Virtual Sonic Enviroments*" Electronic Visualization Laboratory, Department of Computer Science, University of Illinois at Chicago retrieved May 16, 2017.

Henney Oh "The Future of VR Audio-3 Trends to Track This Year" dated Jul. 4, 2017.

Carl Schissler, Aaron Nicholls, and Ravish Mehra "Efficient HRTF-Based Spatial Audio for Area and Volumetric Sources" [retrieved Jan. 31, 2018].

(56) References Cited

OTHER PUBLICATIONS

Hasan Khaddour, Jiri Schimmel, Frantisek Rund "A Novel Combined System of Direction Estimation and Sound Zooming of Multiple Speakers" Radioengineering, vol. 24, No. 2, Jun. 2015.
"Unity 3D Audio"; Nov. 8, 2011; whole document (9 pages).
Wozniewski, M. et al.; "User-Specific Audio Rendering and Steerable Sound for Distributed Virtual Environments"; Proceedings of the 13$^{th}$ International Conference on Auditory Display; Montréal, Canada; Jun. 26-29, 2007; whole document (4 pages).
Galvez, Marcos F. Simon; Menzies, Dylan; Mason, Rusell; Fazi, Filippo Maria *"Object-Based Audio Reproduction Using a Listener-Position Adaptive Stereo System"* University of Southampton http://www.aes.org/e-lib/browse.cfm?elib=18516 [Full Text downloaded Sep. 12, 2018].
Li, Loco Radio Designing High Density Augmented Reality Audio Browsers, PhD Thesis Final, MIT, 2014.

\* cited by examiner

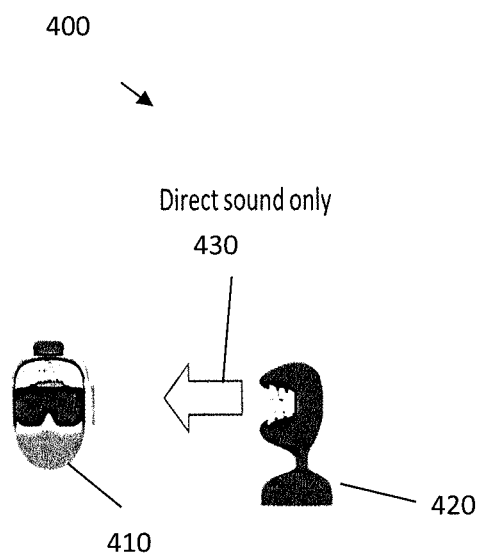
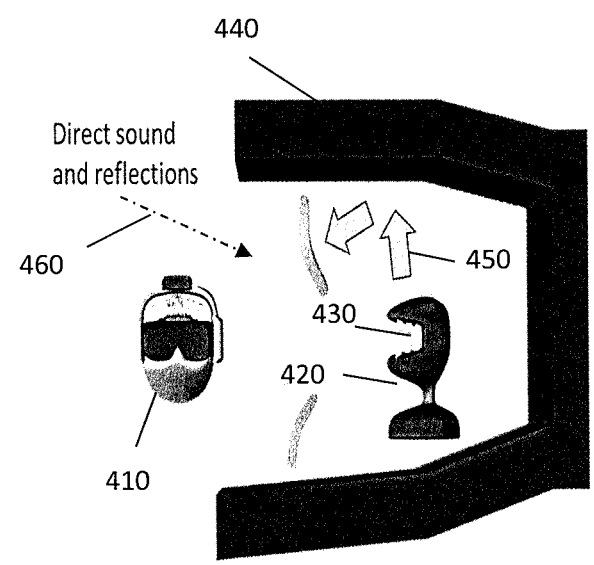
Fig. 4a
Fig. 4b

LEVEL-BASED AUDIO-OBJECT INTERACTIONS

BACKGROUND

Technical Field

The exemplary and non-limiting embodiments relate generally to rendering of free-viewpoint audio for presentation to a user using a spatial rendering engine.

Brief Description of Prior Developments

Free-viewpoint audio generally allows for a user to move around in the audio (or generally, audio-visual or mediated reality) space and experience the audio space in a manner that correctly corresponds to his location and orientation in it. This may enable various virtual reality (VR) and augmented reality (AR) use cases. The spatial audio may consist, for example, of a channel-based bed and audio-objects, audio-objects only, or any equivalent spatial audio representation. While moving in the space, the user may come into contact with audio-objects, the user may distance themselves considerably from other objects, and new objects may also appear. The listening/rendering point may thereby adapt to the user's movement, and the user may interact with the audio-objects, and/or the audio content may otherwise evolve due to the changes relative to the rendering point or user action.

SUMMARY

The following summary is merely intended to be exemplary. The summary is not intended to limit the scope of the claims.

In accordance with one aspect, an example method comprises, obtaining a listening position in an audio space; obtaining audio and metadata corresponding to a rendering at the listening position; obtaining a listening environment and determining an effect of the listening environment on the rendering at the listening position; detecting audio interaction at the listening position by comparing an audio rendering level against a corresponding level threshold metadata; applying, by a processing device, an audio modification according to the audio interaction detection; and rendering audio at the listening position based on the applied audio modification.

In accordance with another aspect, an example apparatus comprises at least one processor; and at least one non-transitory memory including computer program code, the at least one memory and the computer program code configured to, with the at least one processor, cause the apparatus to: obtain a listening position in an audio space; obtain audio and metadata corresponding to a rendering at the listening position; obtain a listening environment and determine an effect of the listening environment on the rendering at the listening position; detect audio interaction at the listening position by comparing an audio rendering level against a corresponding level threshold metadata; apply an audio modification according to the audio interaction detection; and render audio at the listening position based on the applied audio modification.

In accordance with another aspect, an example apparatus comprises a non-transitory program storage device readable by a machine, tangibly embodying a program of instructions executable by the machine for performing operations, the operations comprising: obtaining a listening position associated with a user; obtaining audio and metadata corresponding to a rendering at the listening position; obtaining a listening environment and determining an effect of the listening environment on the rendering at the listening position; detecting audio interaction at the listening position by comparing an audio rendering level against a corresponding level threshold metadata; applying an audio modification according to the audio interaction detection; and rendering audio at the listening position based on the applied audio modification.

BRIEF DESCRIPTION OF THE DRAWINGS

The foregoing aspects and other features are explained in the following description, taken in connection with the accompanying drawings, wherein:

FIGS. 4a and 4b are diagrams illustrating a VR user listening to the same audio source in an open space (FIG. 4a) and a space with strong reflections (FIG. 4b);

DETAILED DESCRIPTION OF EMBODIMENTS

Figure 1:
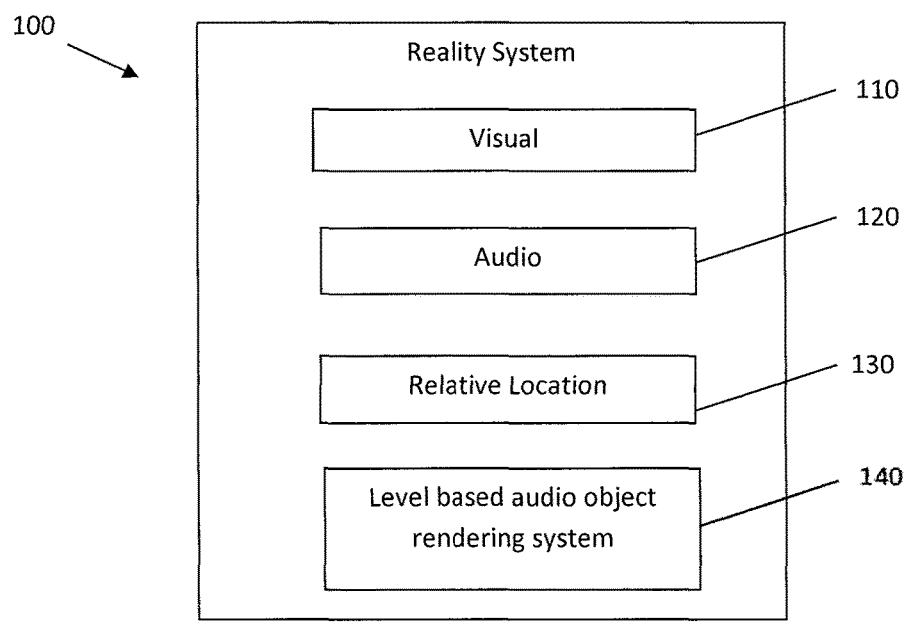
FIG. 1 is a diagram illustrating a reality system comprising features of an example embodiment.

Referring to FIG. 1, a diagram is shown illustrating a reality system 100 incorporating features of an example embodiment. The reality system 100 may be used by a user for augmented-reality (AR), virtual-reality (VR), or presence-captured (PC) experiences and content consumption, for example, which incorporate free-viewpoint audio. Although the features will be described with reference to the example embodiments shown in the drawings, it should be understood that features can be embodied in many alternate forms of embodiments.

The system 100 generally comprises a visual system 110, an audio system 120, a relative location system 130 and a level based audio object rendering system 140. The visual system 110 is configured to provide visual images to a user. For example, the visual system 12 may comprise a virtual reality (VR) headset, goggles or glasses. The audio system 120 is configured to provide audio sound to the user, such as by one or more speakers, a VR headset, or ear buds for example. The relative location system 130 is configured to sense a location of the user, such as the user's head for example, and determine the location of the user in the realm of the reality content consumption space. The movement in the reality content consumption space may be based on actual user movement, user-controlled movement, and/or some other externally-controlled movement or pre-determined movement, or any combination of these. The user is able to move and turn their head in the content consumption space of the free-viewpoint. The relative location system 130 may be able to change what the user sees and hears based upon the user's movement in the real-world; that real-world movement changing what the user sees and hears in the free-viewpoint rendering.

The movement of the user, interaction with audio-objects and things seen and heard by the user may be defined by predetermined parameters including an effective distance parameter and a reversibility parameter. An effective distance parameter may be a core parameter that defines the distance from which user interaction is considered for the current audio-object. In some embodiments, the effective distance parameter may also be considered a modification adjustment parameter, which may be applied to modification of interactions, as described in U.S. patent application Ser. No. 15/293,607, filed Oct. 14, 2016, which is hereby incorporated by reference. A reversibility parameter may also be considered a core parameter, and may define the reversibility of the interaction response. The reversibility parameter may also be considered a modification adjustment parameter. Although particular modes of audio-object interaction are described herein for ease of explanation, brevity and simplicity, it should be understood that the methods described herein may be applied to other types of audio-object interactions.

The user may be virtually located in the free-viewpoint content space, or in other words, receive a rendering corresponding to a location in the free-viewpoint rendering. Audio-objects may be rendered to the user at this user location. The area around a selected listening point may be defined based on user input, based on use case or content specific settings, and/or based on particular implementations of the audio rendering. Additionally, the area may in some embodiments be defined at least partly based on an indirect user or system setting such as the overall output level of the system (for example, some sounds may not be audible when the sound pressure level at the output is reduced). In such instances the output level input to an application may result in particular sounds being not rendered because the sound level associated with these audio-objects may be considered imperceptible from the listening point. In other instances, distant sounds with higher output levels (such as, for example, an explosion or similar loud event) may be exempted from the requirement (in other words, these sounds may be rendered). A process such as dynamic range control may also affect the rendering, and therefore the area, if the audio output level is considered in the area definition.

The level based audio object rendering system 140 is configured to implement a parameterized audio-object interaction detection and rendering control via tracking of the listening position for audio rendering volume level. By considering the sound pressure level of the audio at the listening position, the contribution of the spatial audio environment automatically is taken into account. The level based audio object rendering system 140 may furthermore determine metadata for parameterized audio-object interaction detection and rendering control via tracking of the listening position for audio rendering volume level.

The audio-object interaction may be defined as a modification of the audio-object rendering for presentation to the user due to a triggering based on at least a user position in the spatial audio scene overlapping with an audio object position. While this locational conflict abnormality may be defined in some systems or example embodiments based on a metadata parameter specifying at least a first distance between the user and the audio object, the level based audio object rendering system 140 may require no distance metadata to determine an overlap or audio-object interaction. Instead, the level based audio object rendering system 140 may use metadata related to perception of the audio (for example, the volume or level per frequency bin) to determine the overlap. Thus, the level based audio object rendering system 140 may automatically take into account the room acoustics contribution of an individual audio object for its interaction control. The level estimation may generally be done per frequency bin and these measures may then be combined into a single measure, for example, in a manner incorporating psychoacoustics.

Considering the above, level based audio object rendering system 140 may allow both 1) an alternative implementation for audio-object interactions significantly differing from the distance based systems and 2) an improvement over the distance based systems in terms of providing a capability to adjust for sound pressure and a spatial environment.

Figure 2:
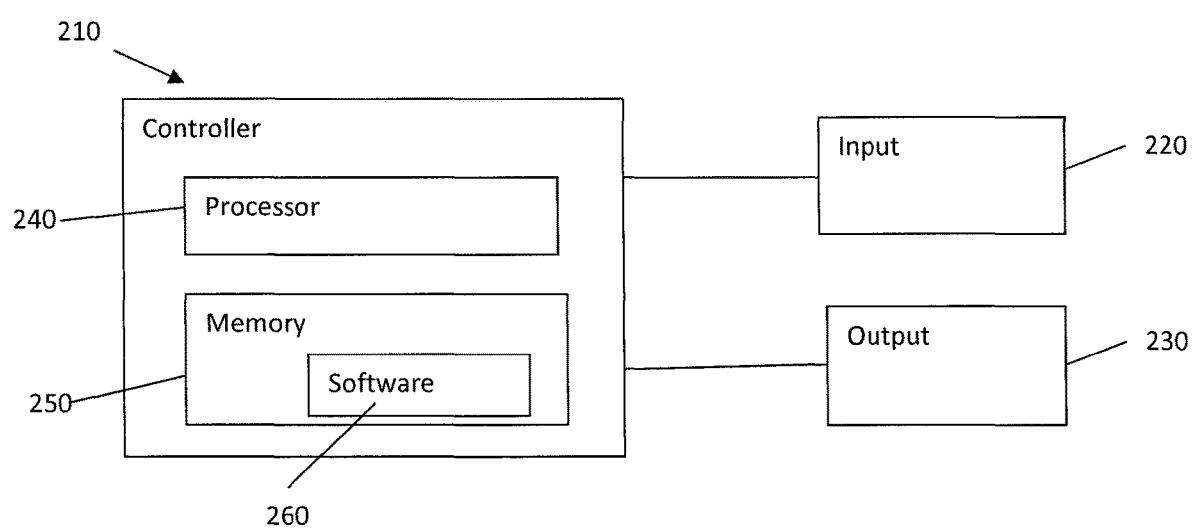
FIG. 2 is a diagram illustrating some components of the system shown in FIG. 1.

Referring also to FIG. 2, the reality system 100 generally comprises one or more controllers 210, one or more inputs 220 and one or more outputs 230. The input(s) 220 may comprise, for example, location sensors of the relative location system 130 and the level based audio object rendering system 140, rendering information for level based audio object rendering system 140, reality information from another device, such as over the Internet for example, or any other suitable device for inputting information into the system 100. The output(s) 230 may comprise, for example, a display on a VR headset of the visual system 110, speakers of the audio system 120, and a communications output to communication information to another device. The controller(s) 210 may comprise one or more processors 240 and one or more memory 250 having software 260 (or machine-readable instructions).

Figure 3A:
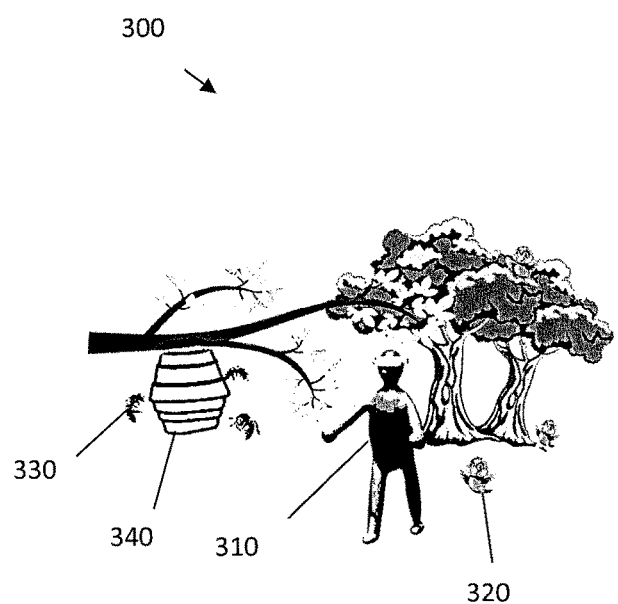
FIGS. 3a and 3b are diagrams illustrating characteristics of free-viewpoint content consumption.
Figure 3B:
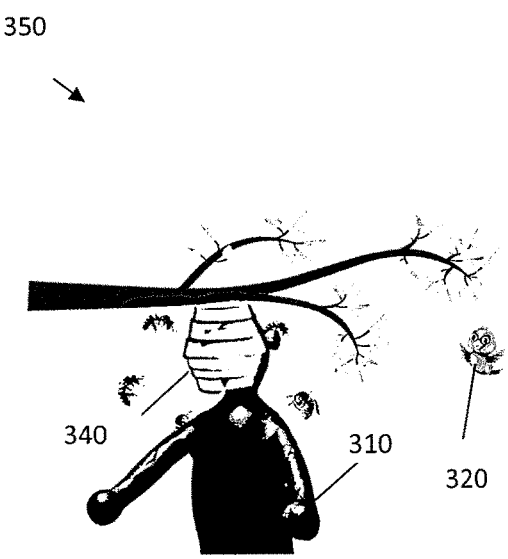

Referring also to FIGS. 3a and 3b, diagrams 300, 350 illustrating characteristics of free-viewpoint content consumption are shown.

FIG. 3a illustrates a user 310 navigating around an audiovisual free-viewpoint VR experience 300. The user 310 is surrounded by a nature scene, where the user 310 hears, for example, birds singing 320 around the user 310 and bees buzzing 330 at some distance in front of the user 310. As the user 310 moves forward (FIG. 3b), the user 310 may come into contact with the beehive 340 that may, in terms of audio (or audio-wise), consist, for example, of a single audio-object. This is an example use case in which a definition for an interaction between the user and the audio-object is required for an immersive free-viewpoint audio experience.

In instances in which sound is detected by microphones (in a similar manner as by ears), the sound is determined based on sound pressure. In acoustics, the sound pressure of a spherical wave-front that radiates from a point source is known to decrease by 6.02 dB with a doubling of the distance. This corresponds to a decrease of 50%, or a halving, of the sound pressure. Accordingly, the sound pressure decreases as $1/r$, while the sound intensity decreases as $1/r^2$. This may be reflected in the sound that the user 310 experiences as they move throughout the audiovisual free-viewpoint VR experience 300.

Referring also to FIGS. 4a and 4b, diagrams illustrating a VR user listening to the same audio source in an open space (4a) and a space with strong reflections (4b) are shown.

FIGS. 4a and 4b present a user 410 listening to 6DoF free-viewpoint audio content, illustrated in this instance as sound emanating from audio source 420 (illustrated as a dinosaur). In an open space (FIG. 4a), the user 410 mainly hears the direct sound component 430 from a sound source 420. However, when the same audio source is placed into a reverberant space 440, such as a room or a cave (FIG. 4b), the user 410 may increasingly receive (and hear) additional reflections 450 as well as the direct sound 430. The characteristics of the environment and the relative positions of the user 410 and the sound source 420 may determine how these components are combined and what the sum 460 (of direct sound and reflections) will sound like. Embodiments described herein provide functionality for immersive 6DoF use cases, based on level based audio object rendering system 140 considering the differences between the spatial audio environments.

Referring back to FIGS. 4a and 4b, implementation of an audio-object interaction system that does not incorporate the effect of reflections, the same inherent audio-object interaction for the two cases of FIGS. 4a and 4b may be determined. However, level based audio object rendering system 140 may determine (for example, observe) that the reflections (in FIG. 4b) contribute to the received sound pressure 1) picked up by our ears in the real world, or 2) to the presentation level through headphones in the virtual 6DOF free-viewpoint world), and may adjust to compensate for the difference between the two cases to the user percept. In instances in which the difference is not compensated for, problems may arise for two reasons, among other reasons. Firstly, the percept in case of FIG. 4b may be louder. As the audio-object interaction may result in increase of the playback volume, the additional loudness caused by the environment may become disturbing. Secondly, the audio-object interaction may result in an audio rendering modification such as, for example, added reverberance (for example, added reverberant or echoing sounds may result). The spatial audio environment may similarly add reverberance to the percept. These two different modification components may interact in a way which does not result in the desired output percept. For example, the volume may greatly vary over time or the reverberance may become very strong or noisy.

Level based audio object rendering system 140 may provide support for processes of audio-object interactions in spatial audio environments. Level based audio object rendering system 140 may process the interactions such that for two instances of an audio object, such as those illustrated in FIGS. 4a and 4b, will behave differently because their rendering instructions (metadata) are different and an interaction definition based on object-to-user distance takes the environment into account. Level based audio object rendering system 140 may implement processes that overcome the liabilities to ad hoc approaches to correcting the difference in spatial environment (for example, ad hoc approaches such as adapting an audio object to different known environments through manual work by the content creator (and with support of additional metadata)). Level based audio object rendering system 140 may provide capability to adapt rendering in a highly interactive audiovisual space that may also be modified during consumption. Thus, in response to changes in the acoustic and/or "physical" properties of the space during the content consumption, Level based audio object rendering system 140 may provide controls that take these changes into account in rendering. For example, the roof or walls of a building may be opened, or the audio objects may be moved, for example, from a very large room to a much smaller room. One example of this is a multi-user use case of sharing content from a first space into a second space. Level based audio object rendering system 140 may provide tools to address these changes in a direct manner.

Level based audio object rendering system 140 may consider the spatial audio environment for audio-object interactions. Level based audio object rendering system 140 may factor the environment into renderings in order to provide the most immersive user experience for the user. Level based audio object rendering system 140 may provide processes that correspond to the dynamic nature of the audiovisual environment itself, and reduce or eliminate a necessity for manual controls of the spatial audio environment through separate parameters, which may become a time and/or resource consuming task. Level based audio object rendering system 140 may allow for creating (or be incorporated into) more efficient content creation tools.

Level based audio object rendering system 140 may implement a parameterized audio-object interaction detection and rendering control system, based on tracking of the listening position audio rendering volume level. The listening position in the audio space may be associated with a user and, in some example embodiments, may be a free-view and in other example embodiments 3DoF AR/VR. The audio space may refer to the AR/VR space populated by one or more audio sources. The user may have a listening position in this space, and the listening position (which may include the head rotation of the user) affects the rendering. By considering the sound pressure or volume level of the audio at the listening position in an audio space, level based audio object rendering system 140 may automatically take into account the contribution of the spatial audio environment. This is because the environment directly contributes to the listening position sound pressure through reflections etc. In instances in which the level based audio object rendering system 140 only considers the direct sound (for example, for complexity reasons) the level based audio object interaction rendering system 140 may behave similarly (for example, determine audio objects interactions in a similar manner) to systems which determine tracking solely based on distance information. Level based audio object rendering system 140 may track the distance between the listening position and the audio object. The acoustic space may not have an effect on this distance. Level based audio object rendering system 140 may detect and measure the effect of the environment on the audio-object interaction.

The listening environment may refer to the part of the audio space that may affect (for example, by modeling of the geometry etc.) the rendering of at least the audio source under consideration (for example, an audio interaction) at the user's listening position in the audio space. The listening environment may in some instances refer to the physical space of the user but does not necessarily correspond to the physical space. For example, with regard to VR use cases, the listening environment may not correspond to a physical space as the system attempts to remove the user from the real world. In instances of AR, the physical space may actually be the listening environment. However, in an example advanced AR use case, the rendering may take into account the physical space around the user as well as a virtual (augmented) element of the audio space.

In some example embodiments, the spatial audio environment effects such as reverberation may be evaluated and utilized for the audio-object interaction detection and control separately from the direct sound pressure.

Level based audio object rendering system 140 may improve a content creator's ability to take into account various aspects of the 6DoF audio environment and experience thus allowing for improved user experience. In some instances, a content creator may provide instructions to have the spatial audio environment not implement an effect on the audio-object interactions, for example by defining a metadata flag to override this functionality. Level based audio object rendering system 140 may therefore allow the content creator to enable either 1) audio object interactions that do not factor the spatial environment or 2) audio object interactions that factor the spatial environment, depending on the use case.

Level based audio object rendering system 140 may be implemented in a standalone audio-interaction rendering system, and may also be used in conjunction with systems that determine renderings of audio object interactions based (for example, only) on distance metadata. Level based audio object rendering system 140 may be implemented, for example, through defining a set of parameters that are stored and transmitted as audio-object metadata. Alternatively, such metadata may refer to a channel, a track, or, for example, a set of directional audio sub-band components or parameters. Level based audio object rendering system 140 may be implemented in a spatial audio rendering software product and in any hardware product that allows for 6DoF immersive audio experiences.

Level based audio object rendering system 140 may enable intuitive audio-object interactions that may automatically take room acoustic properties into account to provide improved realism and immersion.

Figure 5:
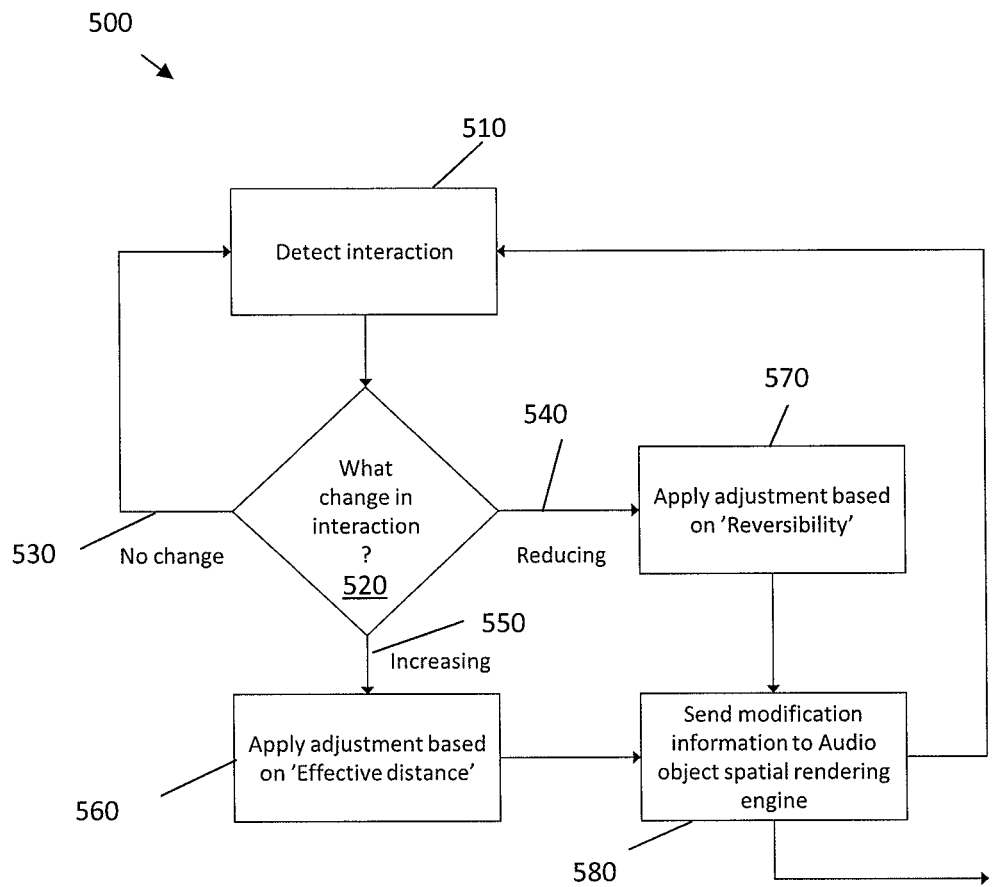
FIG. 5 is an example high-level block diagram of interaction detection and audio-object modification.

Referring also to FIG. 5, an example illustration 500 of a high-level block diagram of interaction detection and audio-object modification is shown.

FIG. 5 illustrates interaction detection and audio-object modification based on distance parameters. The processes illustrated in FIG. 5 may be implemented in some example embodiments together with systems for level based audio object rendering.

As shown in FIG. 5, at step 510, a system that determines renderings of audio object interactions based on distance metadata (not shown, for example, a system such as further described in U.S. patent application Ser. No. 15/293,607, filed Oct. 14, 2016, which is hereby incorporated by reference), may monitor for and detect an audio object interaction. The system may determine whether a change in interaction has been detected 520. If no change 530 in interaction is detected, the system may continue to monitor for interactions 510.

In instances in which a reduced interaction is detected (step 540), the system may apply adjustment based on reversibility 570 and send the modification information to an audio object spatial rendering engine 580. In instances in which an increased audio object interaction is detected (step 550), the system may apply adjustment based on effective distance 560 and send the modification information to an audio object spatial rendering engine 580. The audio object spatial modification engine may take care of applying the modification of the audio-object for rendering/presentation to the user.

Figure 6:
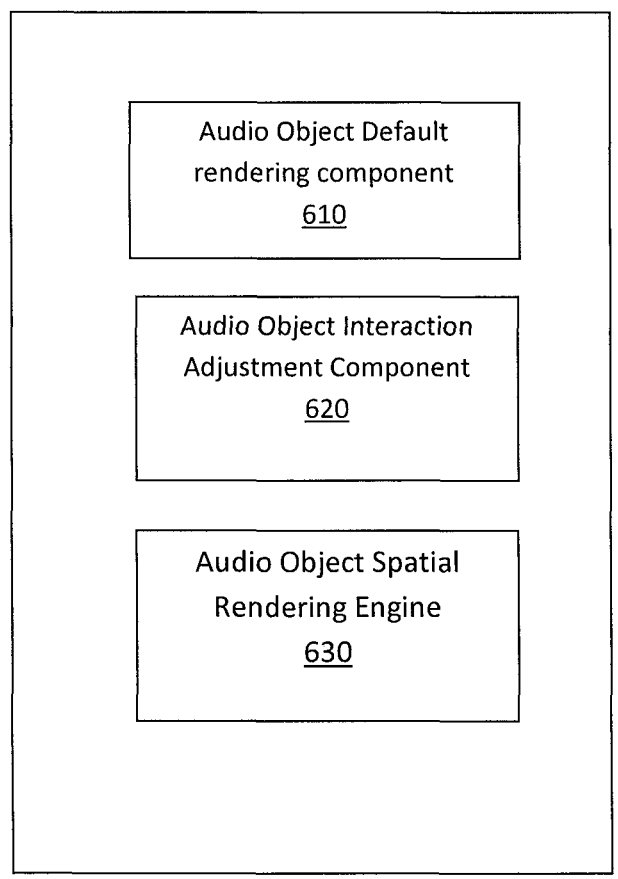
FIG. 6 is an example block diagram illustrating a level based audio object rendering system.

Referring also to FIG. 6, an example block diagram illustrating a level based audio object rendering system 140 is shown. Level based audio object rendering system 140 includes an audio object default rendering component 610, an audio object interaction adjustment component 620, and an audio object spatial rendering engine 630.

Level based audio object rendering system 140 may apply processes so that the audio-object interaction modification of a single audio object performed by the modification engine acoustically differs between an open space and a closed space. Level based audio object rendering system 140 may provide the content creator with intuitive and efficient tools to take requirements of differences between open spaces and closed spaces into account in designing an overall user experience. Level based audio object rendering system 140 may provide an alternative method of interaction detection to adding parameters to the framework proposed in U.S. patent application Ser. No. 15/293,607, filed Oct. 14, 2016.

Audio object default rendering component 610 may determine a default audio rendering based on an audio-object interaction paradigm based on tracking at least one object-to-user distance. As the distance between the audio source and the listener also relates to a change in sound pressure, audio object default rendering component 610 may use the sound pressure of the audio object as observed at the listening position as the basis for determining the triggering and the strength of the audio-object interaction.

Audio object default rendering component 610 may (at least to some degree) define the effect of the spatial audio environment to listener percept in terms of the volume level (or sound pressure). Further, to control further changes in user's percept due to the spatial audio environment, such as reverberance, audio object interaction adjustment component 620 may also consider measures or parameters related to such effects.

Audio object default rendering component 610 may observe at least the rendering of each audio object in the current spatial audio environment at the user's listening position (for example, the rendering position). Audio object default rendering component 610 may define as 'default rendering' the rendering of the audio-object at the user listening position in absence of any audio-interaction.

Audio object interaction adjustment component 620 may obtain (for example, at least in some embodiments also) the corresponding rendering under an ongoing audio-object interaction. Audio object interaction adjustment component 620 may thereby take into account for example a position change of the audio object due to the audio-object interaction.

The default rendering may in some example embodiments include the effect of the spatial audio environment, meaning the reflections or even obstacles (which may in some example embodiments include other users) that may affect the direct sound. In some example embodiments, the default rendering may not include these effects related to the environment. In these instances, audio object interaction adjustment component 620 may provide an implementation of the audio object interactions in which no explicit distance metadata is used.

Audio object interaction adjustment component 620 may compare the default rendering against at least one threshold that the content creator may provide instructions to the system to generally define (for example, via an entry to a metadata field that is part of a content download). This may be a relative measure based on the direct audio object time-domain signal where the time of travel between the audio source and the user's listening point has been compensated for. Thus, the measure may be a single value or it may be, for example, a time-varying threshold envelope depending on the implementation. The threshold may be a measure of sound pressure or a measure related to sound pressure. The threshold may be, for example, a value expressed in decibels (dB). This time-varying threshold envelope may allow a different interaction response strength at different times. The interaction response may vary according to playback time of the audio, playback time of the whole experience, or a particular time-based input that is provided.

Audio object interaction adjustment component 620 may determine the case of an ongoing audio-object interaction and the detection of a new audio-object interaction in separate manners. This is for two reasons. Firstly, audio object interaction adjustment component 620 may implement separate thresholds for triggering an audio-object interaction and maintaining one.

Audio object interaction adjustment component 620 may implement these different thresholds in a similar manner as the first distance parameter effective distance and other modification parameter reversibility are implemented, by way of example, in FIG. 5. The effective distance and reversibility parameters, however, do not allow for directly taking into account the spatial audio environment, which the audio object interaction adjustment component 620 may achieve. Further, audio object interaction adjustment component 620 may provide a capability to allow for a different set of modification parameters to take effect when an audio-object interaction is ended. The audio object default rendering and the interaction may be implemented by the audio object spatial rendering engine 630.

Level based audio object rendering system 140 may be implemented with other audio object interaction systems such as a spatial audio rendering point extension (for example using a system such as described in U.S. patent application Ser. No. 15/412,561, filed Jan. 23, 2017, which is hereby incorporated by reference) and smooth rendering of overlapping audio-object interactions (for example using a system such as described in U.S. patent application Ser. No. 15/463,513, filed Mar. 20, 2017, which is hereby incorporated by reference). These systems may be exploited in conjunction with level based audio object rendering system 140, which may provide audio-object interaction detection based on the level of the percept.

Figure 7:
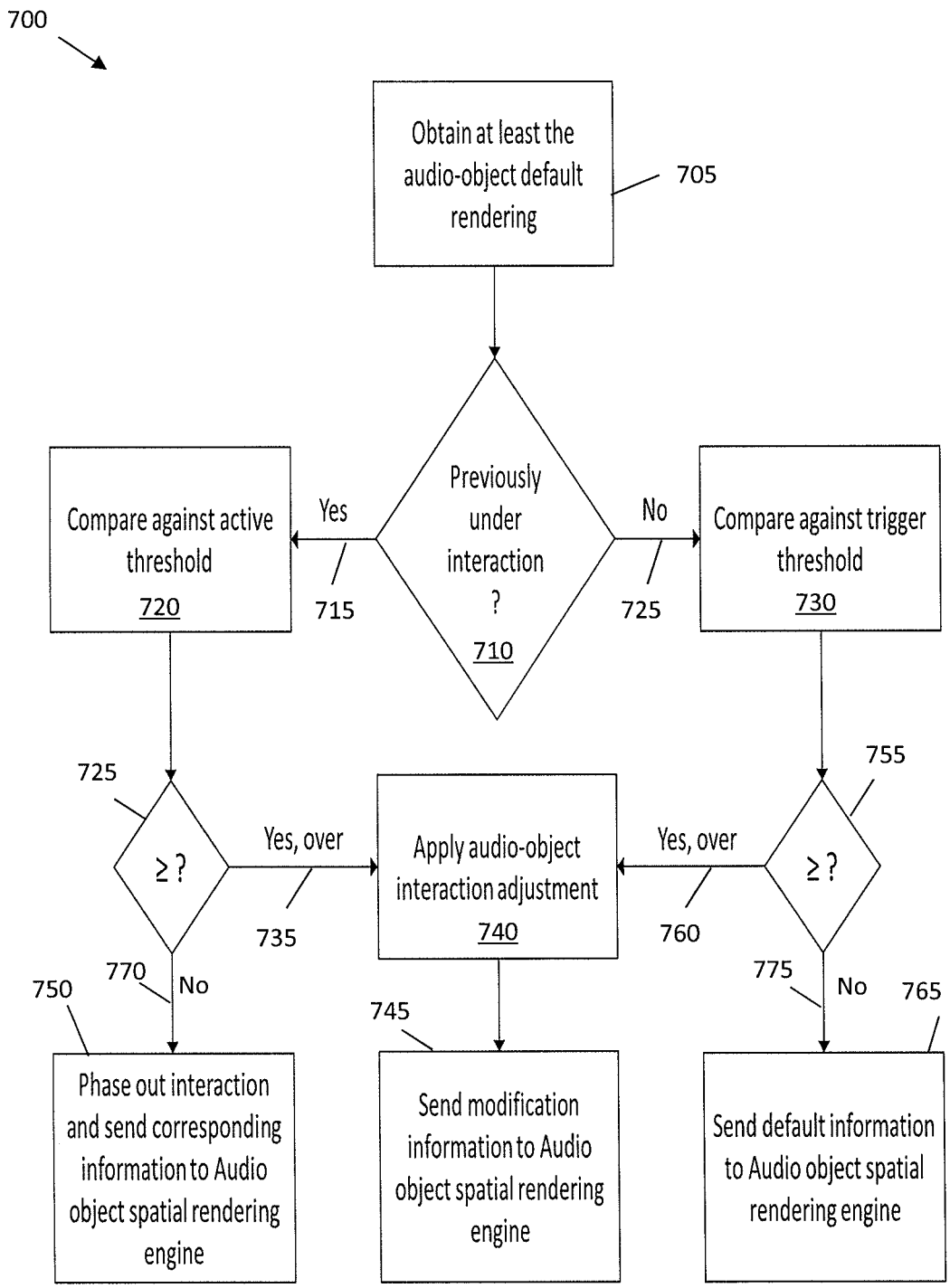
FIG. 7 is an example high-level block diagram of interaction detection and audio-object modification implementing Level-based audio-object interactions.

FIG. 7 is an example high-level block diagram 700 of interaction detection and audio-object modification.

FIG. 7 illustrates a high-level block diagram of the audio-object interaction detection and interaction modification of an audio object that may be implemented by level based audio object rendering system 140, for example using processes as described herein with respect to FIG. 6 hereinabove.

As shown in FIG. 7, at block 705, the system may obtain an audio object default rendering.

At step 710, the system may determine whether the audio object rendering was previously under interaction. If the audio object rendering was previously under interaction (715, yes), the system may compare a sound pressure measure (for example, related to interaction of the rendering) against an active threshold 720 and determine if the sound pressure measure is equal to or exceeds the threshold 725. If the sound pressure measure equals or exceeds the threshold (yes, over 735), the system may apply an audio object interaction adjustment 740 and send modification information to audio object spatial rendering engine 630. If the sound pressure measure is under the threshold (no, 770), the system may phase out interaction and send corresponding information to audio object spatial rendering engine 630 (step 750).

At step 710, if the audio object rendering was not previously under interaction 725, no, the system may compare the sound pressure measure against a trigger threshold 730 and determine if the sound pressure measure is equal to or exceeds the threshold 755. If the sound pressure measure equals or exceeds the trigger threshold (yes, over 760), the system may apply an audio object interaction adjustment 740 and send modification information to audio object spatial rendering engine 630. If the sound pressure measure is under the trigger threshold (no, 775), the system may send default information to audio object spatial rendering engine 630 (step 765).

Step 765 (for example, send default information to audio object spatial rendering engine 630) and step 750 (for example, phase out interaction and send corresponding information to audio object spatial rendering engine) may be the same in some example embodiments. At least in some example embodiments, an audio-object interaction that ends may be phased out using a specific set of modification parameters that differ from both the default rendering and the audio-object interaction rendering. The content creator may, for example, provide instructions to make it clear for a user that an audio-object interaction has just ended. The content creator may define a response, for example, based on an audio effect/processing that is rendered according to a metadata setting that is stored in the content stream. This may be achieved, for example, by using a specific (for example, particular visual, haptic and/or aural) effect. The user may be presented with audio according to the set metadata. The user may experience the effect and thereby understand that a change in rendering, the interaction has ended.

The sound pressure measure and the (active and trigger) thresholds relate to the audio-object audio, which may be available for the system (or rendered by the system). Thus, the system may require no other calibration or reference volume level. However, in some example embodiments there may be at least one calibration level or other reference (such as a reference signal), which may be utilized for example for purposes of dynamic range control (DRC).

In some example embodiments, the system may separately compare the direct sound and reflections. This may be done, for example, in order not to duplicate a reverberation effect. Such duplication may happen, for example, if a user interacts with an audio object in a highly reverberant space and the interaction metadata associated with the audio source or object (including instructions provided by the content, reflecting the content creator's choice of interaction effect) also consists of a reverb effect. Thus, the audio object spatial modification engine 630 may in such instances ignore a specific audio-object interaction modification (such as the reverb effect), and it may, at least in some example embodiments, substitute this with another effect. In some example embodiments, a secondary effect may be communicated by the content creator using a metadata entry.

Figure 8:
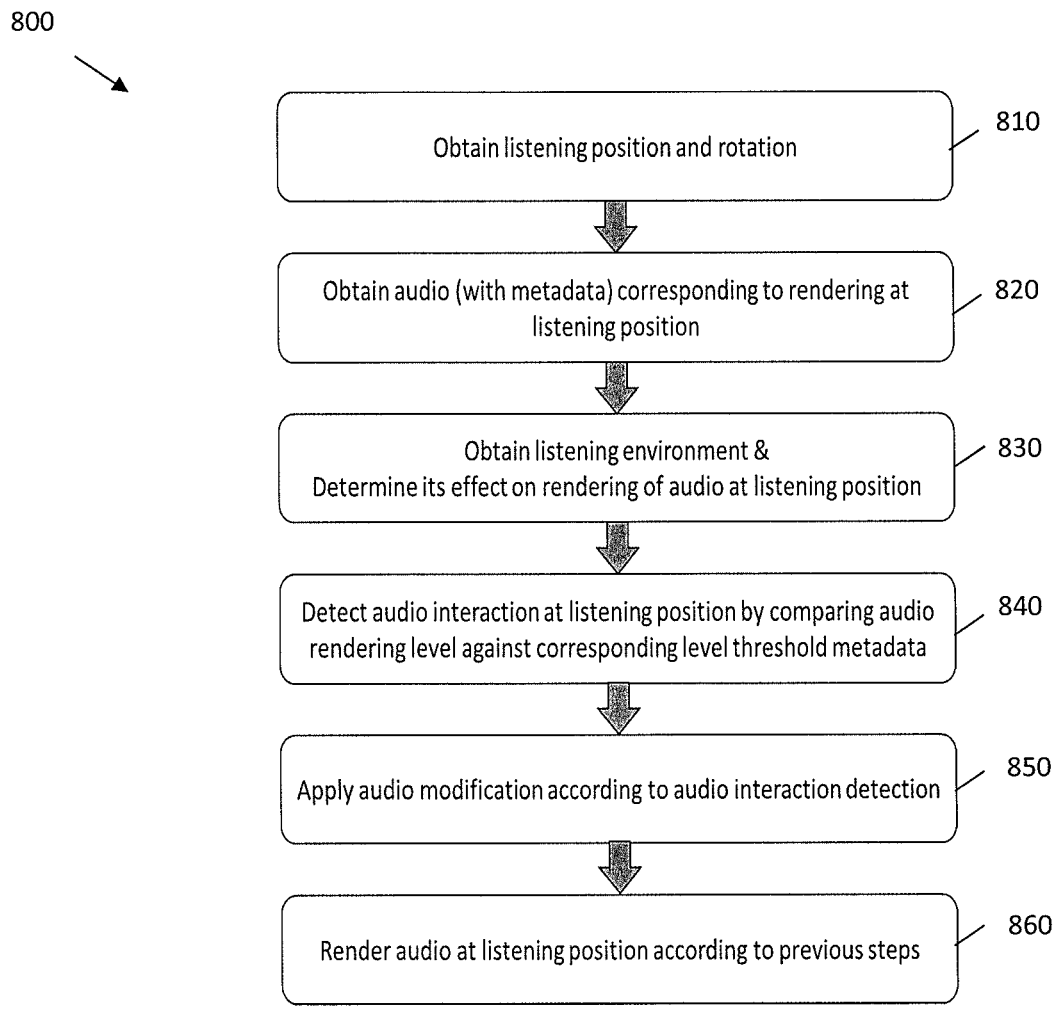
FIG. 8 shows a method in accordance with example embodiments which may be performed by an apparatus.

FIG. 8 shows a method in accordance with example embodiments which may be performed by an apparatus. FIG. 8 illustrates a summary overview of processes according to an example embodiment. While some example embodiments may specifically consider object-based audio, other embodiments described herein may address 6DoF audio more generally.

At block 810, the system may obtain the listening position (the virtual user position). This may include the listening position and rotation associated with the user.

At block 820, based on the listening position, the system may then obtain the audio (such as audio objects) to be rendered to the user for this position. At least in some example embodiments, the user rotation may already be considered in these steps.

At block 830, the system may obtain the listening environment description or model of the environment. This model may specify how the audio rendering is modified by the environment at the listening position. This may include reflections, damping by various materials, and in some example embodiments, active scene understanding such as the effect of other users.

In some example embodiments, the listening environment may include a VR model or a real AR space of a user. The AR implementations (for example, for different use cases) may be processed as an extension of VR use case, in which a capture device in AR consumption may obtain (at a minimum) a base model of the real room acoustics and after that utilize the similar steps as for the VR use case.

The effect of the listening environment for the percept may be based on the accuracy of particular implementation. For example, a simple example implementation may consider the direct sound and a single reflection only, or a direct sound with a reverberation effect derived based on the model. A complex example implementation, on the other hand, may consider a high number of reflections or the real room impulse response (RIR).

Thus, the (default) rendering of the audio is available for the spatial audio rendering system 630. In a more advanced system, any effects of the spatial audio environment are similarly available for the renderer.

The system (at block 840) may detect interaction at listening position by comparing audio rendering level against corresponding level threshold metadata. For example, the system may compare the sound pressure of the audio rendering (in some example embodiments, including the spatial audio environment effects) against the at least one threshold after having defined and made available metadata related to at least one sound pressure threshold. This allows for detection of the audio interactions and also the control of their extent.

At block 850, the system may apply the modification to the audio according to the audio interaction detection results.

At block 860, the audio may be rendered at the listening position and presented to the user. At least at this step, the rotation of the user's head may also be considered in order to correctly present the spatial audio directions.

Without in any way limiting the scope, interpretation, or application of the claims appearing below, a technical effect of one or more of the example embodiments disclosed herein is that the system enables intuitive audio-object interactions that may automatically take room acoustic properties into account to provide improved realism and immersion. Another advantage of the system is that, when particular conditions are fulfilled, the system may use modification parameters, such as location, scale, rotation, amplification, equalization, directiveness (for example, the direction in which the sound propagates), and time shift. In addition, further modification parameters, such as spatial extent and reverb may be used.

It is furthermore noted that in some example implementations, both the volume-based (for example as implemented by level based audio object rendering system 140) and the distance-based aspects may be considered together. For example, a specific content may support only one of these methods. A renderer implementation may then utilize the set of processes that enables the intended experience for the user given the available metadata. In another example embodiment, a content creator may provide instructions to differentiate between a first set of audio-object interactions that depend on the spatial audio environment and a second set that do not. This may be achieved via use of a dedicated metadata flag.

The example embodiments may provide tools that allow a content creator to define their content's rendering as well as possible (for example, with greater correspondence to a physical audio environment). Taking into account the effects of the spatial audio environment enables this. Additionally, a metadata flag may allow for switching between the two modes of operation for each audio-object (and, in some instances, the flag may be time-varying), which greatly enhances the content creator's creative choices. This increases the accuracy of representations as one of the key differentiators of 6DoF AR/VR is the user's ability to roam the scene and both have the scene react to the user and allow the user to directly interact with various objects.

In accordance with an example, a method may include obtaining a listening position associated with a user; obtaining audio and metadata corresponding to a rendering at the listening position; obtaining a listening environment and determining an effect of the listening environment on the rendering at the listening position; detecting audio interaction at the listening position by comparing an audio rendering level against a corresponding level threshold metadata; applying, by a processing device, an audio modification according to the audio interaction detection; and rendering audio at the listening position based on the applied audio modification.

In accordance with another example, wherein detecting the audio interaction at the listening position by comparing the audio rendering level against the corresponding level threshold metadata further comprises: determining whether the audio at the listening position was previously under interaction; in response to a determination that the audio at the listening position was previously under interaction, comparing the audio at the listening position to an active threshold; and in response to a determination that the audio is over the active threshold, applying an audio interaction adjustment and sending modification information to an audio object spatial rendering engine.

In accordance with another example, in response to a determination that the audio is under the active threshold, phasing out the audio interaction and sending corresponding information to the audio object spatial rendering engine.

In accordance with another example, providing a specific effect to notify a user than an audio object interaction has ended.

In accordance with another example, wherein detecting the audio interaction at the listening position by comparing the audio rendering level against the corresponding level threshold metadata further comprises: determining whether the audio at the listening position was previously under interaction; in response to a determination that the audio at the listening position was not previously under interaction, comparing the audio at the listening position to a trigger threshold; and in response to a determination that the audio is over the trigger threshold, applying an audio interaction adjustment and sending modification information to an audio object spatial rendering engine.

In accordance with another example, in response to a determination that the audio is under the trigger threshold, sending default information to the audio object spatial rendering engine.

In accordance with another example, wherein the audio rendering level comprises at least one of a sound pressure level and a volume level.

In accordance with another example, wherein detecting the audio interaction at the listening position by comparing the audio rendering level against the corresponding level threshold metadata further comprises: comparing separately a direct sound and a reflected sound; and ignoring a reverb effect if the reverb effect is detected.

In accordance with another example, substituting a secondary effect for the reverb effect.

In accordance with another example, checking a metadata flag to determine whether to apply the audio modification.

In accordance with another example, wherein the audio and the metadata further comprises: one or more of at least one track, at least one channel, and a set of directional sub-band components.

In accordance with another example, an example apparatus may comprise at least one processor; and at least one non-transitory memory including computer program code, the at least one memory and the computer program code configured to, with the at least one processor, cause the apparatus to: obtain a listening position associated with a user; obtain audio and metadata corresponding to a rendering at the listening position; obtain a listening environment and determine an effect of the listening environment on the rendering at the listening position; detect audio interaction at the listening position by comparing an audio rendering level against a corresponding level threshold metadata; apply an audio modification according to the audio interaction detection; and render audio at the listening position based on the applied audio modification.

In accordance with another example, an example apparatus may comprise a non-transitory program storage device readable by a machine, tangibly embodying a program of instructions executable by the machine for performing operations, the operations comprising: obtaining a listening position associated with a user; obtaining audio and metadata corresponding to a rendering at the listening position; obtaining a listening environment and determining an effect of the listening environment on the rendering at the listening position; detecting audio interaction at the listening position by comparing an audio rendering level against a corresponding level threshold metadata; applying an audio modification according to the audio interaction detection; and rendering audio at the listening position based on the applied audio modification.

In accordance with another example, an example apparatus comprises: means for obtaining a listening position associated with a user; means for obtaining audio and metadata corresponding to a rendering at the listening position; obtaining a listening environment and determining an effect of the listening environment on the rendering at the listening position; means for detecting audio interaction at the listening position by comparing an audio rendering level against a corresponding level threshold metadata; means for applying an audio modification according to the audio interaction detection; and means for rendering audio at the listening position based on the applied audio modification.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   obtaining a virtual listening position in an audio space, wherein the audio space is at least partially virtual;
   obtaining an audio signal and information corresponding to rendering for at least one virtual audio object at the virtual listening position, wherein the information includes at least one corresponding level threshold at the virtual listening position in the audio space;
   determining a first audio rendering of the audio signal at the virtual listening position in the audio space, wherein the determined first audio rendering of the audio signal comprises, at least, an audio rendering level;
   detecting audio interaction of the at least one virtual audio object at the virtual listening position, where the detection comprises determining that the audio rendering level of the determined first audio rendering is greater than the at least one corresponding level threshold at the virtual listening position in the audio space;
   applying, with a processing device, an audio modification to the audio signal in response to the detected audio interaction to form a modified audio signal for the at least one virtual audio object at the virtual listening position, wherein the audio modification is configured to at least one of:
      compensate for an increase in volume due to reverberation caused, at least partially, by a characteristic of the audio space, or
      control an amount of reverberation associated with the at least one virtual audio object; and
   performing, in response to the detected audio interaction, a free-viewpoint rendering with the modified audio signal of the at least one virtual audio object at the virtual listening position.

2. The method of claim 1, wherein the detection further comprises:
   determining whether the at least one virtual audio object at the virtual listening position was previously under audio interaction;
   in response to a determination that the at least one virtual audio object at the virtual listening position was previously under audio interaction, comparing the audio rendering level of the determined first audio rendering at the virtual listening position to an active threshold; and
   in response to a determination that the audio rendering level is over the active threshold, applying an audio interaction adjustment and sending modification information to an audio object spatial rendering engine.

3. The method of claim 2, further comprising:
   in response to a determination that the audio rendering level is under the active threshold, phasing out the audio interaction and sending corresponding information to the audio object spatial rendering engine.

4. The method of claim 3, further comprising:
   providing a specific effect to notify a user that the audio interaction has ended.

5. The method of claim 1, wherein the detection further comprises:
   determining whether the at least one virtual audio object at the virtual listening position was previously under audio interaction;
   in response to a determination that the at least one virtual audio object at the virtual listening position was not previously under audio interaction, comparing the audio rendering level of the determined first audio rendering at the virtual listening position to a trigger threshold; and
   in response to a determination that the audio rendering level is over the trigger threshold, applying an audio interaction adjustment and sending modification information to an audio object spatial rendering engine.

6. The method of claim 5, further comprising:
   in response to a determination that the audio rendering level is under the trigger threshold, sending default information to the audio object spatial rendering engine.

7. The method of claim 1, wherein the determined first audio rendering of the audio signal at the virtual listening position in the audio space comprises a default rendering of the audio signal at the virtual listening position in the audio space, wherein the audio rendering level of the determined first audio rendering comprises a default audio rendering level, wherein the default audio rendering level comprises at least one of:
   a sound pressure level, or
   a volume level.

8. The method of claim 1, further comprising determining a proposed audio modification, wherein the proposed audio modification comprises a reverb effect, wherein applying the audio modification further comprises:
   determining a direct sound of the at least one virtual audio object and a reflected sound of the at least one virtual audio object based, at least partially, on the virtual listening position and the information corresponding to rendering for the at least one virtual audio object at the virtual listening position;
   comparing the direct sound of the at least one virtual audio object and the reflected sound of the at least one virtual audio object to identify an interaction effect, wherein the interaction effect comprises an effect produced through combination of the direct sound of the at least one virtual audio object and the reflected sound of the at least one virtual audio object;
   determining that the proposed audio modification would have an effect when applied to the at least one virtual audio object equivalent to the interaction effect; and
   applying a secondary effect as the audio modification applied.

9. The method of claim 1, further comprising:
   checking a metadata flag to determine that the audio modification is to be applied.

10. The method of claim 1, wherein the audio signal and the information further comprises:
    one or more of:
       at least one track,
       at least one channel, and/or
       a set of directional sub-band components.

11. The method of claim 1, wherein the at least one corresponding level threshold at the virtual listening position in the audio space comprises one of:
    a single value or
    a time varying threshold envelope.

12. The method of claim 1, wherein the audio modification is based, at least partially, on one or more characteristics of the audio space and at least one of: the virtual listening position, or a position of the at least one virtual audio object, wherein the performing of the free-viewpoint rendering with the modified audio signal of the at least one virtual audio object at the virtual listening position further comprises:
    performing a six-degrees of freedom free-viewpoint rendering with the modified audio signal of the at least one virtual audio object based on a rotation of a user.

13. The method of claim 1, wherein the audio rendering level of the determined first audio rendering is based, at least partially, on at least one of:
    a position of the at least one virtual audio object in the audio space,
    respective levels of a plurality of frequency bins relative to the virtual listening position, or
    a direct sound of the at least one virtual audio object and one or more reflections of the at least one virtual audio object,
    the method further comprising:
       identifying a listening environment at the virtual listening position;
       determining an effect of the listening environment on the audio rendering level of the determined first audio rendering at the virtual listening position; and
       applying the effect to the at least one virtual audio object.

14. The method of claim 1, wherein the audio space comprises a virtual reality audio space or an augmented reality audio space, wherein the audio modification is based, at least partially, on whether the audio space comprises an open space or a closed space.

15. The method of claim 1, wherein the determining that the audio rendering level of the determined first audio rendering is greater than the at least one corresponding level threshold at the virtual listening position in the audio space further comprises:
    comparing a direct audio rendering level of the determined first audio rendering against the at least one corresponding level threshold, and
    comparing a reflected audio rendering level of the determined first audio rendering against the at least one corresponding level threshold,
    wherein the determining that the audio rendering level of the determined first audio rendering is greater than the at least one corresponding level threshold at the virtual listening position in the audio space is configured to control or eliminate an effect of a reflected audio rendering.

16. An apparatus comprising:
    at least one processor; and
    at least one non-transitory memory including computer program code, the at least one non-transitory memory and the computer program code configured to, with the at least one processor, cause the apparatus to:
       obtain a virtual listening position in an audio space, wherein the audio space is at least partially virtual;
       obtain an audio signal and information corresponding to rendering for at least one virtual audio object at the virtual listening position, wherein the information includes at least one corresponding threshold level at the virtual listening position in the audio space;
       determine a first audio rendering of the audio signal at the virtual listening position in the audio space, wherein the determined first audio rendering of the audio signal comprises, at least, an audio rendering level;

detect audio interaction of the at least one virtual audio object at the virtual listening position, where the detection comprises determining that the audio rendering level of the determined first audio rendering is greater than the at least one corresponding level threshold at the virtual listening position in the audio space;

apply an audio modification to the audio signal in response to the detection of the audio interaction to form a modified audio signal for the at least one virtual audio object at the virtual listening position, wherein the audio modification is configured to at least one of:

compensate for an increase in volume due to reverberation caused, at least partially, by a characteristic of the audio space, or control an amount of reverberation associated with the at least one virtual audio object; and perform, in response to the detected audio interaction, a free-viewpoint rendering with the modified audio signal of the at least one virtual audio object at the virtual listening position.

17. An apparatus as in claim 16, where the detection of the audio interaction of the at least one virtual audio object at the virtual listening position further comprises the at least one non-transitory memory and the computer program code are configured to, with the at least one processor, cause the apparatus to:

determine whether the at least one virtual audio object at the virtual listening position was previously under audio interaction;

in response to a determination that the at least one virtual audio object at the virtual listening position was previously under audio interaction, compare the audio rendering level of the determined first audio rendering at the virtual listening position to an active threshold; and in response to a determination that the audio is over the active threshold, apply an audio interaction adjustment and send modification information to an audio object spatial rendering engine.

18. An apparatus as in claim 17, where, in response to a determination that the audio rendering level is under the active threshold, the at least one non-transitory memory and the computer program code are configured to, with the at least one processor, cause the apparatus to:

phase out the audio interaction and send corresponding information to the audio object spatial rendering engine.

19. An apparatus as in claim 18, where the at least one non-transitory memory and the computer program code are further configured to, with the at least one processor, cause the apparatus to:

provide a specific effect to notify a user that the audio interaction has ended.

20. An apparatus as in claim 16, where the detection of the audio interaction of the at least one virtual audio object at the virtual listening position further comprises the at least one non-transitory memory and the computer program code are configured to, with the at least one processor, cause the apparatus to:

determine whether the at least one virtual audio object at the virtual listening position was previously under audio interaction;

in response to a determination that the at least one virtual audio object at the virtual listening position was not previously under audio interaction, compare the audio rendering level of the determined first audio rendering at the virtual listening position to a trigger threshold; and in response to a determination that the audio rendering level is over the trigger threshold, apply an audio interaction adjustment and send modification information to an audio object spatial rendering engine.

21. A non-transitory program storage device readable with a machine, tangibly embodying a program of instructions executable with the machine for performing operations, the operations comprising:

obtaining a virtual listening position in an audio space associated with a user, wherein the audio space is at least partially virtual;

obtaining an audio signal and information corresponding to rendering for at least one virtual audio object at the virtual listening position, wherein the information includes at least one corresponding threshold level at the virtual listening position in the audio space;

determining a first audio rendering of the audio signal at the virtual listening position in the audio space, wherein the determined first audio rendering of the audio signal comprises, at least, an audio rendering level;

detecting audio interaction of the at least one virtual audio object at the virtual listening position, where the detection comprises determining that the audio rendering level of the determined first audio rendering is greater than the at least one corresponding level threshold at the virtual listening position in the audio space;

applying an audio modification to the audio signal according to the detected audio interaction to form a modified audio signal for the at least one virtual audio object at the virtual listening position, wherein the audio modification is configured to at least one of:

compensate for an increase in volume due to reverberation caused, at least partially, by a characteristic of the audio space, or control an amount of reverberation associated with the at least one virtual audio object; and performing, in response to the detected audio interaction, a free-viewpoint rendering with the modified audio signal of the at least one virtual audio object at the virtual listening position.

* * * * *